(12) United States Patent
Hietala et al.

(10) Patent No.: US 7,450,111 B2
(45) Date of Patent: Nov. 11, 2008

(54) KEY FUNCTIONALITY FOR COMMUNICATION TERMINAL

(75) Inventors: Nigel Hietala, Oulu (FI); Markku Autio, Oulu (FI); Kalle Sakari Saarinen, Tampere (FI)

(73) Assignee: Nokia Corporation, Espoo (FI)

( * ) Notice: Subject to any disclaimer, the term of this patent is extended or adjusted under 35 U.S.C. 154(b) by 771 days.

(21) Appl. No.: 10/974,540

(22) Filed: Oct. 27, 2004

(65) Prior Publication Data

US 2006/0097993 A1 May 11, 2006

(51) Int. Cl.
*G09G 5/00* (2006.01)
(52) U.S. Cl. .................................. 345/173; 345/156
(58) Field of Classification Search .......... 345/156–173
See application file for complete search history.

(56) References Cited

U.S. PATENT DOCUMENTS

| | | | |
|---|---|---|---|
| 6,285,405 B1 * | 9/2001 | Binford et al. ............. | 348/512 |
| 2002/0140803 A1 * | 10/2002 | Gutta et al. .............. | 348/14.01 |
| 2004/0085351 A1 | 5/2004 | Tokkonen ................ | 345/741 |
| 2004/0108968 A1 | 6/2004 | Anlauff .................. | 345/1.1 |
| 2004/0111476 A1 | 6/2004 | Trossen et al. ............ | 709/206 |
| 2004/0119763 A1 | 6/2004 | Mizobuchi et al. ......... | 345/863 |
| 2004/0185894 A1 | 9/2004 | Vaananen et al. .......... | 455/550.1 |
| 2005/0254200 A1 * | 11/2005 | Matthews et al. .......... | 361/600 |

FOREIGN PATENT DOCUMENTS

| | | |
|---|---|---|
| WO | WO 02/01337 A1 | 1/2002 |
| WO | WO 2004/001576 A1 | 12/2003 |
| WO | WO 2004/057451 A2 | 7/2004 |

OTHER PUBLICATIONS

Q. H. Mahmoud "MIDP Event Handling" http://developers.sun.com/techtopics/mobility/midp/articles/event, Oct. 20, 2004, pp. 1-12.
Mobile Information Device Profile 2.0: Class Canvas, java.microedition.lcdui, Oct. 20, 2004, pp. 1-20.
E. Giguere "Using the MIDP Low-Level User Interface API", http://developers.sun.com/techtopics/mobility/midp/ttips/llapi/, Oct. 20, 2004, pp. 1-5.
Nokia 3600 and 3650 User Guide, May 2003, pp. 1-19.

* cited by examiner

*Primary Examiner*—Nitin Patel
(74) *Attorney, Agent, or Firm*—MacDonald Illig Jones & Britton LLP; Robert M. Bauer, Esq.

(57) ABSTRACT

A multimedia terminal has a touch sensitive display that displays information and receives user inputs. A control unit controls the operation of the terminal in accordance with user inputs received by the touch sensitive display and selectively executes at least one audio application and at least one video application. There are a plurality of user keys. One of the keys changes an audio/video output of the terminal depending on the application being executed by the control unit at the time that the key is selected.

28 Claims, 3 Drawing Sheets

KEY FUNCTIONALITY FOR COMMUNICATION TERMINAL

FIELD OF THE INVENTION

The present invention relates to communication terminals. In particular, the invention relates to the functionality of user keys on a portable communication terminal having a touch sensitive display.

BACKGROUND OF THE RELATED ART

In conventional portable communication terminals, such as a cell phone or personal digital assistant (PDA), the user interface typically includes an LCD display, a keypad for entering characters or a function to be performed by the terminal, and a scroll wheel or other similar pointing device enabling the user to, for example, highlight and select a particular item displayed on the display. Since there is a limited amount of surface area on the terminal, there is an inevitable tradeoff between the size of the terminal and the flexibility and functionality of the user interface.

Touch sensitive displays have been proposed as replacements for the keypad and pointing device. Instead of pressing keys on the keypads to enter characters and functions and using the pointing device to select displayed items, a user can enter characters and functions by touching objects displayed on the touch sensitive display. The touching may consist of taps, in which a point on the touch sensitive display is contacted and then the contact is released at the same point, or slides, in which the touch sensitive display is contacted at a first point and the contact moves to a second point where it is released.

While a touch sensitive display may render a separate keypad moot, there are still some considerations that should be taken into account when using a touch sensitive display on a portable communication terminal. Portable communication terminals are often small and it may be difficult to reliably touch the objects displayed on the touch screen. Entering information and functions via the touch screen is tedious in a moving vehicle, for example, since the accuracy of the contact suffers if the hand or stylus is unsteady. The slippery surface of the stylus tip also can complicate the contact with the desired areas on a touch screen. When touching an area on a touch screen with a stylus, for example, the stylus may slide an unintended distance from the first contact point before it is released. If the point of release of the contact happens to be in a different contact area than the one the touch originally was directed to, the character or function entered may not be the intended character or function or the contact may not be understood and will have to be repeated. This can be overcome by using a large touch screen but that adversely affects the size of the terminal. The size of the contact areas can be increased, but then a smaller number of areas can be displayed on the touch screen at the same time.

Additional user interface considerations also are created if the portable communication terminal utilizing a touch screen is capable of executing various multimedia applications, involving video, audio, imaging or Internet content. The conventional user interfaces for portable communication terminals are not the best match for multimedia terminals having touch screens.

BRIEF SUMMARY

The preferred embodiments described herein address the concerns discussed above. In one aspect, the preferred embodiment is a multimedia terminal having a touch sensitive display and a control unit adapted to control the operation of the terminal and to selectively execute at least one audio application and at least one video application. The terminal has a plurality of user keys, a first keys when selected by the user, performs a first function on an audio output or a video output on the touch sensitive display. The first function depends on the application being executed by the control unit when the first key is selected. In another aspect of the invention, a software program is provided which operates according to such a multimedia communication terminal.

In a second aspect, a preferred embodiment is a communication terminal having a control unit adapted to control the operation of the communication terminal in response to user inputs and to execute a plurality of audio applications. An audio key performs one of a plurality of different functions depending upon the operation of the audio key and the audio application being executed by the control unit when the audio key is operated.

BRIEF DESCRIPTION OF THE DRAWINGS

The preferred embodiments of the invention are described with reference to the accompanying drawings, in which.

DESCRIPTION OF THE PREFERRED EMBODIMENTS

The preferred embodiments of the invention comprise a portable multimedia communication terminal adapted for use in a telecommunication system including base stations and terminals communicating with the base stations. The preferred embodiments may or may not also include short-range communications, such as Bluetooth, an infrared or WLAN connection, for example. The preferred embodiments include a telephone, a smart-phone, a laptop or other portable computer, a handheld computer, or a Personal Digital Assistant (PDA) device that includes or is adapted for connection to a telephone or to other hardware for establishing a network connection. However, the invention is not limited to such embodiments and may be applied in other devices that do not include and are not adapted for connection to a telephone or to other hardware for establishing a network connection.

Figure 1:
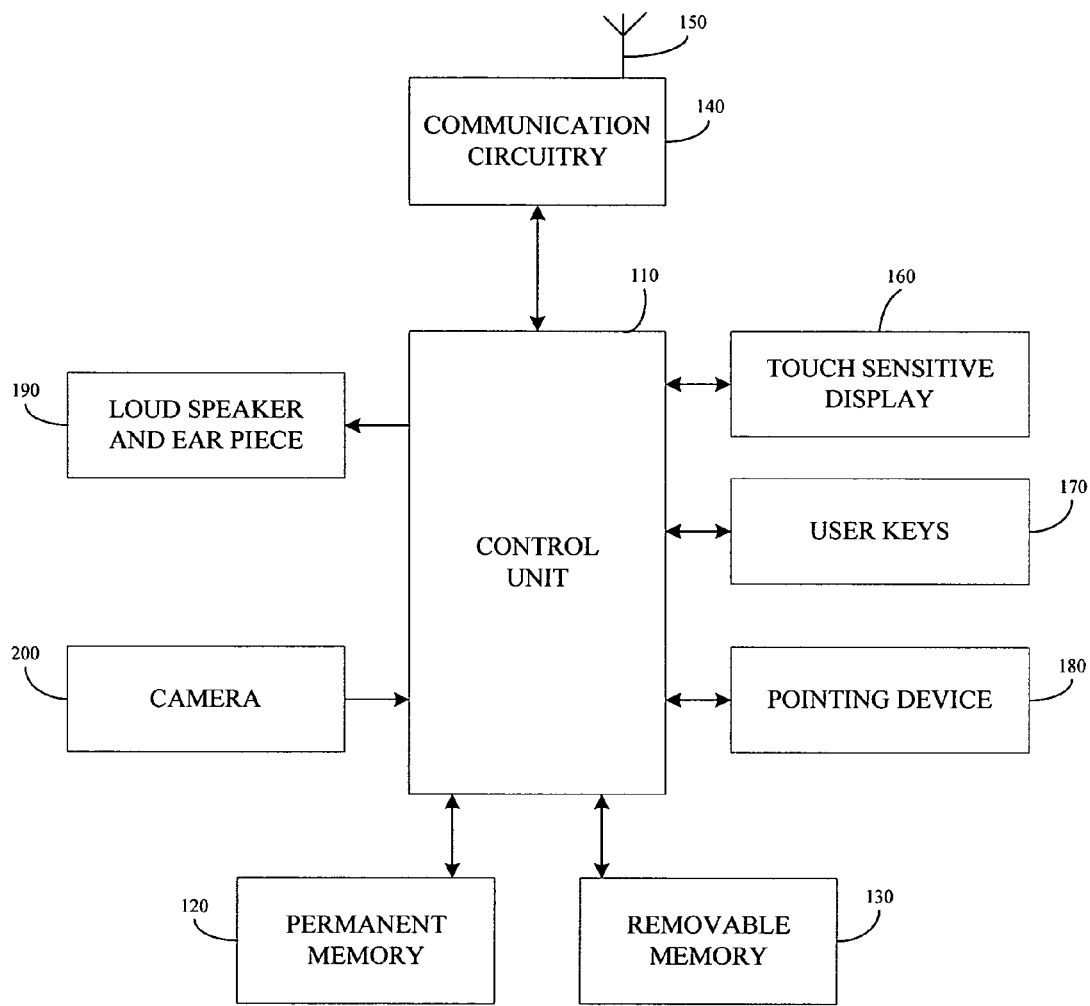
FIG. 1 is a block diagram of one example of the electronics of a portable communication terminal having a touch sensitive display.

FIG. 1 shows a block diagram of one example of the electronics of a portable communication terminal 100. The basic operation and functions of terminal 100 are controlled by a control unit 110. Control unit may be a microprocessor adapted to execute operating system software, such as the Symbian operating system available from Symbian, Ltd. of London, UK, and various software applications. The operating system software is preferably stored in permanent memory 120. The software applications and user data, such as video files, audio files, documents, telephone numbers, calendar information, etc., may be stored in permanent memory 120 or in removable memory 130, such as a flash memory card. The terminal 100 includes wireless communication circuitry 140, such as speech and channel codecs, modulators and transceiver, and an antenna 150 for wirelessly communicating voice and data over a telecommunication system such as, for example, a GSM or other cellular network. Antenna 150 is shown schematically in FIG. 1 and may be an internal antenna or external antenna of any configuration. Terminal 100 includes a touch sensitive display 160, which may be a liquid crystal display (LCD) or any other type of display that is amenable for use as a touch sensitive display. The terminal 100 includes a plurality of user keys 170 and a pointing device 180 for pointing to items displayed on display 160, which pointing device is preferably a four-way scroll button, but which may also be a mouse, track stick or touch pad.

The touch sensitive display 160 may be formed by placing one or more contact surfaces on top of all or a part of a display. One way to form a contact surface is to use two overlapping transparent films and continuous electric current, which is generated between the films when the outer film is pressed with a finger or another object against the lower film, which is covered with a resistive layer. The contact surface may also be implemented capacitively, whereby the surface is covered with an electrically conducting layer, over which an alternating current acts. The capacitance of the human body couples part of the voltage at the contact point to ground, allowing the voltage to be measured. The contact surface can also be implemented acoustically based on ultrasonic waves traversing the surface of the display. When the display is touched, the sonic wave traversing the surface is attenuated, and the change can be measured. The contact surface may also be implemented with infrared light, and as well with said ultrasound, but using infrared light instead of sonic waves.

Figure 2A:
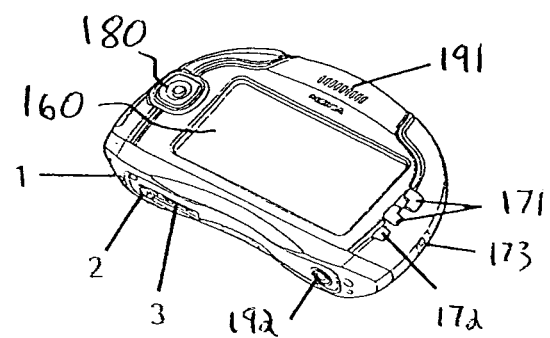
FIG. 2A is a perspective view of the front and bottom of a multimedia communication terminal having a touch sensitive screen and a plurality of keys in a preferred embodiment of the invention.
Figure 2B:
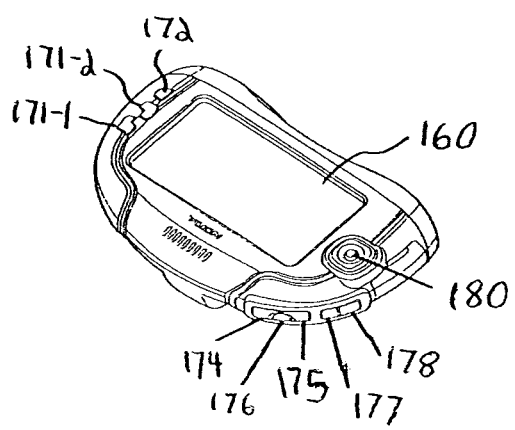
FIG. 2B is a perspective view of the front and top of the multimedia communication terminal in the preferred embodiment.
Figure 2C:
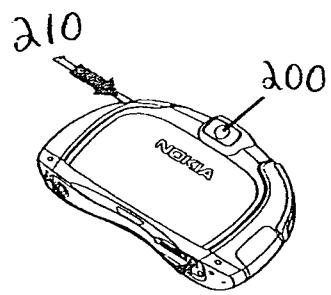
FIG. 2C is a perspective view of the back of the multimedia communication terminal in the preferred embodiment.

FIGS. 2A-2C show the touch sensitive display 160, user keys 170, pointing device 180, and other parts of the user interface of an exemplary portable multimedia communication terminal 100. Touch sensitive display 160 is located on the front of terminal 100. It can be centered or it can be offset as shown in FIG. 2A to permit more advantageous placement of pointing device 180 on the wider side and user keys 171 and 172 on the narrower side. In such an arrangement, user keys 174-178 are preferably located on the top of the narrower side as shown in FIG. 2B. This arrangement suitable facilitates holding of terminal 100 by the user in a manner where user keys 171 and 172 are operated with the thumb of the right hand, user keys 174-178 are operated with the extended forefinger of the left hand, and pointing device 180 is operated by the thumb of the left hand. Microphone 1, battery charger connector 2, connector 3 for handsets, data connecting cables and loopsets, and earpiece 192 are located on the bottom of terminal 200 as shown in FIG. 2A. Loudspeaker 191 is located at the top of the front side. As shown in FIG. 2C, camera 200 is located at the top of the back side and a stylus 210 for contacting touch sensitive display 160 is inserted and stored in the top part of the back side of terminal 100. Of course, key combinations and arrangements may be utilized that are different than that shown in FIGS. 2A-2C.

Touch sensitive display 160 does not react to touches, and user keys 170 and pointing device 180 have no effect, when terminal 100 is turned off or in a locked state (except for a code that has to be entered to remove terminal 100 from the locked state). Terminal 100 may be adapted so that the locked state is activated by user entry of a specific lock code. Terminal 100 may also be adapted to enter the locked state, or instead an idle state, when there is an absence of user input that is entered. In the idle state, touch sensitive display 160 preferably displays a screen saver that includes user instructions for exiting the idle state. The user instructions can be a particular key combination, preferably a combination of keys located on different surfaces of terminal 100 to prevent accidental exiting of the idle state.

Figure 3:
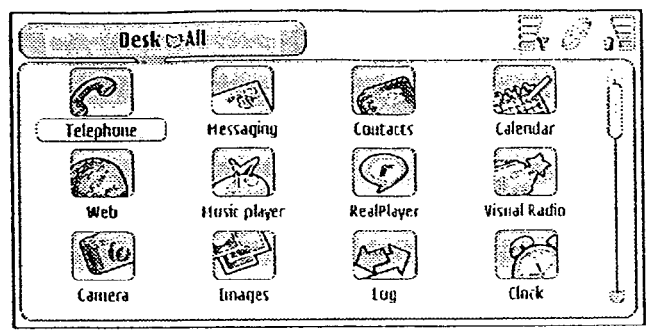
FIG. 3 is an example of the information displayed on the touch sensitive display of the multimedia communication terminal when the terminal is in a home state.

When terminal 100 is first turned on (by pressing and holding a power key), or when a lock state is deactivated, or when the idle state is exited, it enters a home state and displays a start up screen on touch sensitive display 160. This start up screen can also be reached by pressing key 178. An example of such a start up screen is shown in FIG. 3. It includes a title area and status indicators at the top of the screen, a scroll bar to one side of the screen, and a plurality of icons (with names immediately below the icon). It may also optionally contain a toolbar at the bottom of the screen. Key 177 is preferably a menu key that opens a drop down menu from the title area of the start-up screen and from the title area of other applications when open on touch sensitive display 160. Subsequent presses of menu key 177 sequences through dialog pages so that menu selections can be made. Key 172 is preferably an escape key that closes dialog pages without saving changes and returns the display to the first item in a list.

The icons correspond to respective applications or documents stored in terminal 100. An application or document can be selected with pointing device 180 or by contacting the corresponding icon on touch sensitive display 160. The start up screen has a default size for the icons. Depending on the circumstances, the user may find the size of the icons in the start up screen to be too small, thereby making it difficult to reliably contact the desired icon, or too large, thereby limiting the number of icons contained in the start up screen.

To address this situation, key 171-1 is provided to be a zoom key so that the user, with a single key press, can perform a zoom function that changes the start up screen to a different screen in which the icons are larger (and correspondingly a smaller number of icons is contained on the screen). For example, instead of the 4×3 matrix of icons shown in the start up screen of FIG. 3, the screen may have a 3×2 matrix of icons. Of course, the number and arrangement of icons depends on the size and aspect ratio (width×height) of the touch sensitive display 160. The scroll bar also changes simultaneously with the zoom to reflect the different ratio of icons included in the screen to the total number of icons. Each subsequent press of zoom key 171-1 effectuates a further zoom of the screen to a different zoom state, except that when the display is already in the display state have the largest amount of zoom, the display will change to the display state have the least amount of zoom.

Preferably, the zoom function does not merely magnify a portion of the start up screen, but it instead rearranges (and perhaps reformats) them. For example, in the start up screen having a 4×3 matrix of icons as shown in FIG. 3, the top row of icons from left to right is telephone—messaging—contacts—calendar. The second row of icons from left to right is "web—music player—Realplayer—Visual Radio. If zoom key 171-1 is pressed, the resulting 3×2 matrix of icons will have the telephone—messaging—contacts in the top row, but the second row will consist of calendar—web—music player. Furthermore, in some zoom states, the icons can be reformatted into a list format so that the icon image is smaller and the name appears next to the icon image. It is also preferable that the title area, status indicators and toolbar (if any), do not change size and remain fixed through different zoom states. (Optionally, the font size in these areas may be allowed to change.)

The zoom function of key 171-1 is limited in its applicability to the start up screen of the home state and can be used in any software application utilizing the display of information. In particular, the zoom function can be utilized even in software applications where information is merely displayed on the touch sensitive display, such as an electronic book application, and there is no reason for user to make user inputs by contacting the touch sensitive display. The zoom function may be useful simply for changing the font size of displayed text, or the size of other information so that it is easier for the user to view the display is the user has poor eyesight, for example.

One exemplary application utilizing the zoom function of key 171-1 is a camera application. In an exemplary camera application, the touch sensitive display operates as a view finder. Key 171-1 can be operated by the user to zoom the camera lens 200 in or out, changing the outer boundary of the image to be captured by operation of the camera, and the viewfinder display on touch sensitive display 160 changes accordingly.

Another exemplary application that may be responsive to the selection of key 171-1 to perform a zoom function is a web browser application. As is well known, a web browser opens an identified web page on the display when the address of the web page is entered into an address field or a bookmark for the page is selected. The web page may have hyperlinks or other user interactive areas that perform a certain function when selected by the user. A hyperlink changes the display to another web page when selected or opens a new window in which the other web page is displayed. Other user interactive areas may, for example, open a form or provide an animation when selected by the user. The web browser software application may provide for several different zoom states and the selection of key 171-1 will sequence the display from one zoom state to the next. The zoom states may be, for example, 80%, 100%, 120% and a zoom state in which the web page is automatically zoomed to a proportion to fit the screen. There may be areas that remain fixed and not affected when the zoom state of the web pages is changed.

The zoom function performed by selection of key 171-1 is not limited to the software applications mentioned above and may be utilized by any software application, such as video streaming, etc., having a visual component that is displayed on touch sensitive display 160. Furthermore, the different zoom states do not necessarily require a different magnification or any particular type of change in the displayed information and the differences between the various zoom states can be determined by the software application. It therefore follows that the zoom state differences may change from software application to software application. A common aspect is that the portable communication terminal and/or operating system software are adapted so that the zoom function is mapped to a particular physical key and this key functionality in the user interface can be invoked by suitable programming of a software application. While providing a particular physical key for the zoom function is advantageous, it is not necessarily exclusive and the software application may or may not provide some other method, such as displaying a "zoom?" button on touch sensitive display 160, for displaying a different zoom state.

Preferably, the zoom function of key 171-1 is provided in the user interface along with a switch view function for key 171-2. Keys 171-1 and 171-2 may be associated and closely positioned to each other, as shown in FIGS. 2A and 2B or otherwise, or they may be positioned farther away from each other. The association of keys 171-1 and 171-2 may be indicated in any manner, such as providing keys 171-1 and 171-2 in the same or similar color, texture or marking that differentiates them from other parts of the terminal.

The operation of key 171-2 is preferably the same as that of key 171-1 and likewise is not limited in its availability and may be utilized in any software application having visual information displayed on touch sensitive display 160. In any particular software application, the switch view function performed by selection of key 171-2 may be available to the user along with the zoom function performed by selection of key 171-1, or the software application may utilize only one or the other function.

Figure 4:
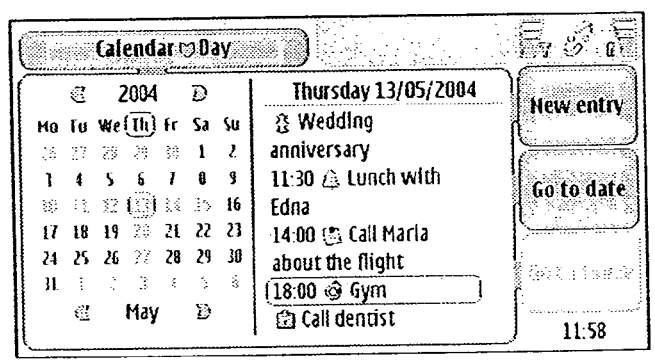
FIG. 4 is an example of a first display view of an application on the touch sensitive display.
Figure 5:
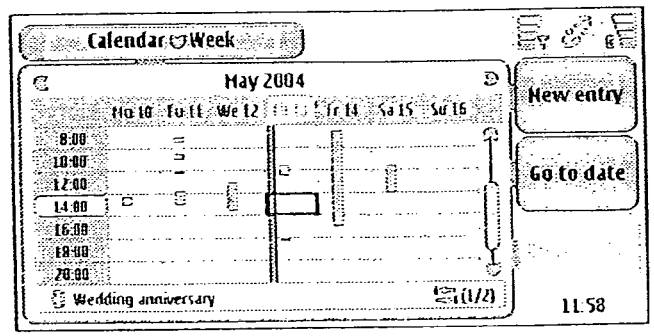
FIG. 5 is an example of a second display view of an application on the touch sensitive display.

The web browser will be described as an example of a software application in which both functions are made available to the user. As explained above, the web browser can display multiple web pages by either changing the display from one web page to another or by opening a web page in a new window. Selection of key 171-2 by the user will result in the web browser performing a switch view function in which the display on touch sensitive display 160 changes from one window (displaying one web page) to another window (displaying another web page). Within a window, key 171-1 can be selected by the user to change the zoom state of that window. Preferably, the zoom state of one window can be changed without changing the zoom state of any other window. The user can interact with the web page displayed in each view As another example application, keys 171-1 and 171-2 may also be used to perform the zoom function and switch view function in a calendar application in which the user can create, check and set alarms for various scheduled events and appointments. The calendar entries in such an application preferably can be created by the user or can be obtained by synchronizing the terminal with the calendar application (such as Microsoft Outlook or Lotus Notes) operating on another device. The calendar application may have multiple views. A first exemplary view is the day view is shown in FIG. 4. A second exemplary view is the week view is shown in FIG. 5. The user can switch between the two views by selecting key 171-2. Although only two views are shown here, there can be more than two views and the user can sequence through the various views by repeatedly pressing key 171-2.

There is no minimal amount of differences that must be present between the multiple views. Indeed, the example views in FIGS. 4 and 5 have some common display elements—both views highlight the current day, show the current time, provide an element to scroll the days displayed in the view and include command buttons on the right hand side. Both views also will have common background functions such as the manner of creating, editing, searching, sending and deleting time entries and to-do-notes, the types of time entries (i.e., tentative, busy, free, out-of-office), and available icons (for alarms, notes, recurring events and all day events).

There are some quite obvious differences in the layout of the exemplary views shown in FIGS. 4 and 5. In the day view shown in FIG. 4, the days of a month are shown in the left half of the display and details of the entries for a particular selected day are automatically shown in the right half of the display. In the week view shown in FIG. 5, the days of a selected week are shown in columns across the display and time boxes of each day extend vertically. The status of selected time boxes are shown with bars and the time entry(ies) for a selected time box are obtained by selecting a time box. When a time box is selected, the details of the time entry(ies) for the selected time box can appear at the bottom of the display, as shown in FIG. 5, or in a separate display or overlay window. Of course, if there is more than one time entry, only one time entry is shown at a time with numbers such as "⅓" to show that the shown time entry is the first of three time entries.

Unlike the web browser application described above in which the different views merely corresponded to different windows and the zoom function is the same in each view (window), the zoom function is different in the different exemplary views of FIGS. 4 and 5. For example, in the day view of FIG. 4, the zoom function may change the zoom state of the time entries in only the right half of the display, while in the week view of FIG. 5, the zoom function may change the size of the time boxes (and consequently modify the corresponding scroll bar accordingly). Again, it may be that a change in the zoom state of one view has no effect on the zoom state of another view.

The web browser and calendar applications described above and mere examples, and any software application may utilize the switch view function in response to user selection of key 171-2. The different views may be typical views. For example, in an image viewer application, the different views may comprise one view may be a thumbnail view in which the images are shown as thumbnail images, one view may be a list view in which the information image files are listed without seeing the images, etc.

While associated keys 171-1 and 171-2 may be used as described above for any given software application containing a visual, that is not meant to preclude their use in some other manner, particularly for a portable multimedia communication terminal. For example, the terminal may support Java applications and, in particular, Java games. The Mobile Information Device Profile (MIDP) defines a plurality of different game actions and each key code is mapped to one of the plurality of game actions. See, for example, MIDP Event Handling, by Qusay H. Mahmoud, posted on the Developers webpage of Sun Microsystems. Thus, when the software application is a Java game, keys 171-1 and 171-2 can each be mapped to one of the Java game functions and the corresponding game function (such as Fire) is performed instead of the zoom function or the switch view function. For this reason, keys 171-1 and 171-2 may be closely located to each other (as illustrated or otherwise) to assist the user in game play.

In addition to keys 171-1 and 171-2 functioning in a different manner in different applications, it is preferable that it also be possible for the terminal to function in a different manner within the same application. A particular software application may have keys 171-1 and 171-2 function in a different manner depending on the state of the application or it may permit the user to somehow change the function of the keys. This set of keys helps to conserve space on the surface of a portable multimedia communication terminal having a touch screen display while also providing a user interface with effective key functionality.

A telephone application will be utilized as an example to show how the keys might operate in two different manners during a single use of the terminal as a telephone. The telephone application may have two views prior to a phone call. In a first view, the touch sensitive display 160 may display a telephone simulation view having a duplicate of a standard telephone keypad (keys 1-9, # key, and * key), and the user dials by selecting a proper sequence of keys. In a second view, the touch sensitive display 160 may display a speed dialing view have a plurality of pre-stored telephone number and/or names, and the user dials by making a single selection of one of the speed dial options. Key 171-2 can be used to switch between the simulated and speed dialing views and key 171-1 can be used to zoom the simulated telephone keypad and the speed dialing options. Once a telephone call is established, the dialing views are no longer necessary. At that point, keys 171-1 and 171-2 may be used to respectively increase or decrease the volume of the telephone call. Of course, this method may be applied to any audio application. For example, in a music player application, the keys could first be used to switch and zoom views related to searching and playing music files, and then once a music file starts playing, the keys could be used to increase or decrease the volume of the music.

For a preferred embodiment of a portable multimedia communication terminal having at least one audio application, key 176 may be an audio key performing a plurality of different audio related functions. These functions may consist of, for example, audio recording, voice dialing and the switching between loudspeaker 191 and earpiece 192 during a telephone call. Audio recording allows the user to record audio or to insert audio clips to a multimedia message. In the voice dialing eature, the user says a name or other identifier that has been previously recorded as a voice tag and associated with a telephone number, voice recognition matches the speech with the appropriate voice tag, and the telephone number corresponding to the voice tag is dialed.

The different functions are preferably enabled by audio key 176 as follows. The user quickly presses and releases audio key 176 to start or stop audio recording. Voice dialing is initiated when audio key 176 is pressed and held by the user for a relatively long period of time. A start tone may be played or a note may be displayed when audio key 176 has been held for a sufficient period of time to initiate voice dialing. This period of time may be preset to be about 0.8 seconds, for example, or it may be set and adjusted by the user. During a telephone call, pressing audio key 176 will toggle the audio output of the call between loudspeaker 191 and earpiece 192. Preferably, audio key 176 is located near call handling keys 174 and 175, either in the configuration and location shown in FIG. 2B or otherwise. Call handling keys 174 and 175 may be a conventional start/answer key and end/reject key. This audio key feature helps to conserve space on the surface of a portable multimedia communication terminal with a touch screen display while also providing a user interface with effective key functionality.

Although a plurality of specific preferred embodiments are described above, the invention is not limited thereto, but can be modified and adapted in any number of ways within the scope of the appended claims.

What is claimed is:

1. A multimedia terminal comprising:
    a touch sensitive display;
    a control unit adapted to control the operation of the terminal and to selectively execute at least one audio application and at least one video application; and
    a plurality of user keys, a first one of said keys, when selected by the user when a digital camera application is being executed by the control unit, at least a portion of said touch sensitive display functioning as a viewfinder in said digital camera application, performing zoom function on said camera and on the portion of said touch sensitive display functioning as the viewfinder.

2. A multimedia terminal comprising:
    a touch sensitive display;
    a control unit adapted to control the operation of the terminal and to selectively execute at least one audio application and at least one video application; and
    a plurality of user keys, a first one of said keys, when selected by the user, performing zoom function which rearranges at least portion of the video output on said touch sensitive display, depending on the application being executed by the control unit when said first one of the plurality of keys is selected.

3. A multimedia terminal comprising:
a touch sensitive display;
a control unit adapted to control the operation of the terminal and to selectively execute at least one audio application and at least one video application; and
a plurality of user keys, a first one of said keys, when selected by the user, performing zoom function which reformats at least portion of the video output on said touch sensitive display, depending on the application being executed by the control unit when said first one of the plurality of keys is selected.

4. A multimedia terminal comprising:
a touch sensitive display;
a control unit adapted to control the operation of the terminal and to selectively execute at least one audio application and at least one video application;
a first user key, when selected by the user, performing a first function comprising a zoom function of at least a portion of the video output on said touch sensitive display, depending on the application being executed by the control unit when said first user key is selected; and
a second user key, when selected by the user, performing a second function on an audio output or a video output on said touch sensitive display, the second function depending on the application being executed by the control unit when said second user key is selected.

5. A multimedia terminal according to claim 4, wherein said touch sensitive display comprises a multi-touch display sensitive to touches in which the touch sensitive display is contacted at a first point and the contact moves to a second point where it is released.

6. A multimedia terminal according to claim 4, wherein said first one and said second keys are associated with each other on the terminal.

7. A multimedia terminal according to claim 6, wherein said first and said second keys are grouped with each other on the terminal so as to be operable by the same digit of a user's hand while the user is holding the terminal.

8. A multimedia terminal according to claim 4, wherein the second function performed by said second keys comprises a switch view function that switches at least a portion of the video output on said touch sensitive display from a first view to a second view.

9. A multimedia terminal according to claim 8, wherein the zoom function performed in the first view when said first keys is selected is different than the zoom function performed in the second view when said first keys is selected.

10. A multimedia terminal according to claim 4, wherein said first function is a zoom function and said second function is a switch view function when a first application is being executed and wherein said first function and said second function are game functions when a game application is being executed.

11. A multimedia terminal according to claim 4, wherein said first function performed by said first key and said second function performed by said second key further depends upon the state of said application being executed by said control unit when said first key and said second key is selected.

12. A multimedia terminal according to claim 11, wherein the application being executed by said control unit is a telephone application, the first function is a zoom function and the second function is a switch view function before a telephone call is established, and the first and second functions are to increase and decrease the audio of the telephone call after a telephone call is established.

13. A communication terminal comprising:
a control unit adapted to control the operation of said communication terminal in response to user inputs, and to execute a plurality of audio applications; and
a plurality of user keys, one of said keys being an audio key that performs one of a plurality of different functions depending upon the operation of the audio key and the audio application being executed by the control unit when said audio key is operated,
wherein a first function is performed if said audio key is pressed during a telephone call, a second function is performed if said audio key is pressed for a short period of time when no audio application is being executed, and a third function is performed if said audio key is pressed for a long period of time when no audio application is being executed.

14. A communication terminal according to claim 13, wherein said first function comprises switching the audio of said telephone call between a loudspeaker and an earpiece.

15. A communication terminal according to claim 13, wherein said second function comprises audio recording.

16. A communication terminal according to claim 13, wherein said third function comprises voice dialing.

17. A software program recorded on a tangible medium, said software program when executed on a multimedia communication terminal including a touch sensitive display, a camera and a digital camera application, at least a portion of said touch sensitive display functioning as a viewfinder for said camera, causing said multimedia communication terminal to perform a zoom function on said camera and on at least a portion of a video output on said touch sensitive display functioning as the viewfinder when a first one of a plurality of user keys is selected by the user.

18. A software program recorded on a tangible medium, said software program when executed on a multimedia communication terminal causing said multimedia communication terminal to perform a zoom function on at least a portion of a video output on a touch sensitive display of said terminal when a first user key is selected by the user,
wherein a switch view function is performed on at least a portion of a video output on said touch sensitive display when a second key is selected.

19. A software program according to claim 18, wherein said zoom function rearranges said portion of the video output on said touch sensitive display.

20. A software program according to claim 18, wherein said zoom function reformats said portion of the video output on said touch sensitive display.

21. A software program according to claim 18, wherein said switch view function performed when said second key is selected depends on the application being executed by the control unit when said second key is selected.

22. A software program according to claim 21, wherein said first and said second keys are associated with each other on the terminal.

23. A software program according to claim 22, wherein said first and said second keys are grouped with each other on the terminal so as to be operable by the same digit of a user's hand while the user is holding the terminal.

24. A software program according to claim 18, wherein the switch view function switches at least a portion of the video output on said touch sensitive display from a first view to a second view.

25. A software program according to claim 24, wherein the zoom function performed in the first view when said first key is selected is different than the zoom function performed in the second view when said first key is selected.

26. A software program according to claim 18, wherein said zoom function and said switch view function are game functions when a game application is being executed.

27. A software program according to claim 18, wherein said zoom function performed by said first key and said switch view function performed by said second key further depends upon the state of said application being executed by said control unit when said first key and said second key is selected.

28. A software program according to claim 27, wherein the application being executed by said control unit is a telephone application, the first function is a zoom function and the second function is a switch view function before a telephone call is established, and the first and second functions are to increase and decrease the audio of the telephone call after a telephone call is established.

* * * * *